United States Patent [19]

Farr

[11] 4,443,040
[45] Apr. 17, 1984

[54] HYDRAULIC BOOSTERS FOR VEHICLE BRAKING SYSTEMS

[75] Inventor: Glyn P. R. Farr, Leek Wootton, England

[73] Assignee: Lucas Industries, Birmingham, England

[21] Appl. No.: 367,336

[22] Filed: Apr. 12, 1982

[30] Foreign Application Priority Data

Apr. 23, 1981 [GB] United Kingdom ............... 8112631

[51] Int. Cl.³ .............................................. B60T 13/14
[52] U.S. Cl. ........................................ 303/50; 60/548
[58] Field of Search .................... 60/547.1, 548, 560, 60/563; 303/10, 50, 57

[56] References Cited

U.S. PATENT DOCUMENTS

4,034,566  7/1977  Suketomo et al. ................ 60/548
4,181,371  1/1980  Adachi ............................ 303/50

Primary Examiner—Duane A. Reger
Attorney, Agent, or Firm—Scrivener, Clarke, Scrivener and Johnson

[57] ABSTRACT

In an hydraulic booster for a vehicle braking system a boost piston provides an output force in response to pressurization of a boost chamber under the control of a boost valve mechanism, which controls communication between the boost chamber and a pressure source and the boost chamber and a fluid reservoir. The operation of the boost valve mechanism is controlled by pressure in a control chamber which is pressurized by operation of a pedal-operated input piston. A recuperation valve controls communication between the boost and control chambers, and is operated in response to movement of the input piston. Pressure in the boost chamber acts on the input piston to urge it in a direction to keep the recuperation valve closed. This enables the input piston to work in a bore in the boost piston, with the control chamber in the boost piston and forward of the boost chamber.

9 Claims, 1 Drawing Figure

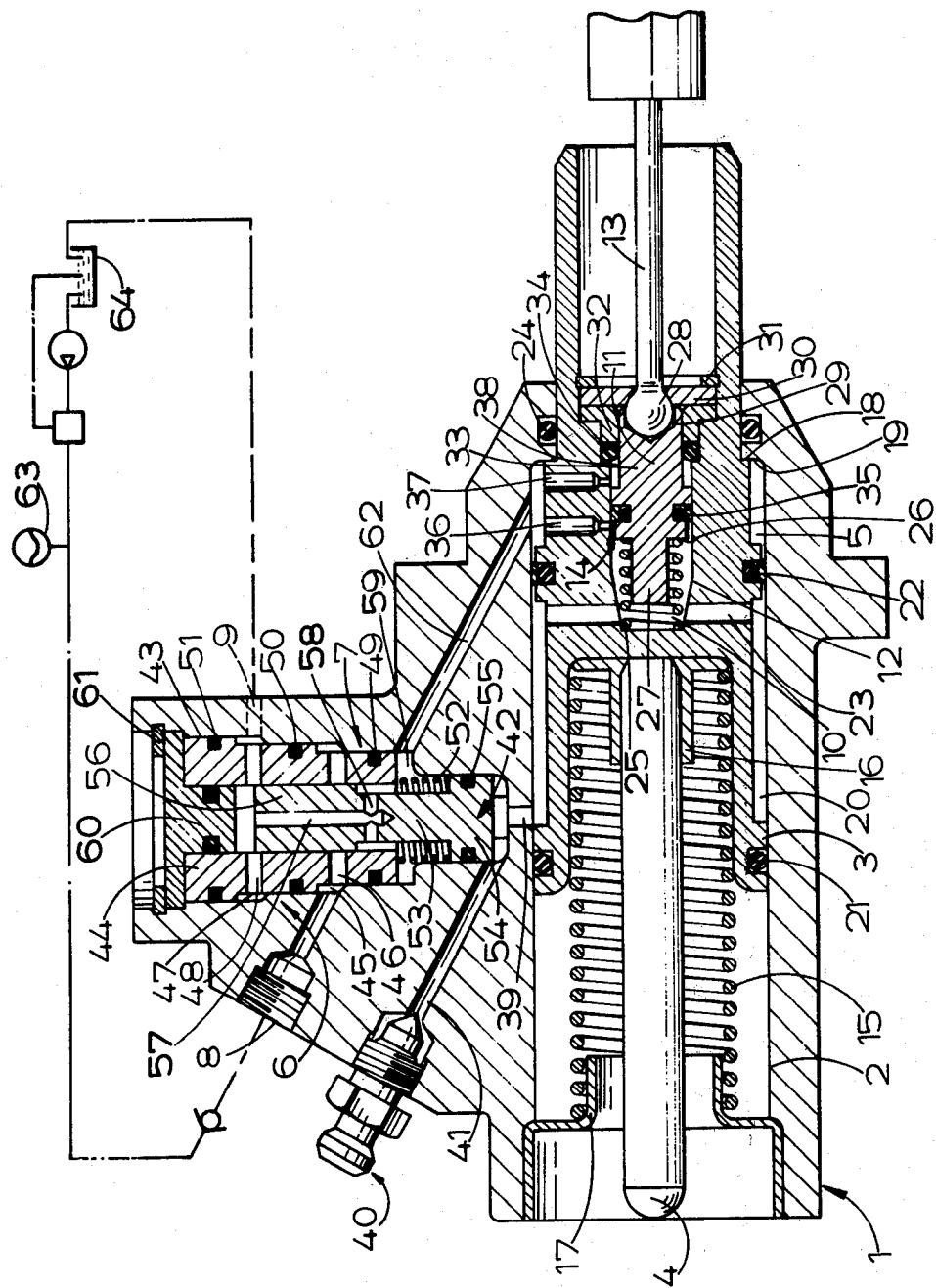

HYDRAULIC BOOSTERS FOR VEHICLE BRAKING SYSTEMS

This invention relates to hydraulic boosters for vehicle braking systems of the kind in which a boost piston working in a bore in a housing is adapted to provide an output force in response to pressurisation of a boost chamber by hydraulic pressure fluid, pressurisation of the boost chamber being controlled by boost valve means operative to control communication between the boost chamber and an inlet for connection to a fluid pressure source, and also communication between the boost chamber and an outlet for connection to a reservoir for fluid, the boost valve means being responsive to pressure in a control chamber of which pressurisation is controlled by operation of a pedal-operated input piston.

In boosters of the kind set forth the control chamber may be connected to a reservoir which is separate from the reservoir for the boost chamber, but this tends to make the construction complex. The booster can be simplified if the control chamber is connected, through the boost chamber, to the reservoir for the boost chamber. The connection is made through a recuperation valve, which is closed in response to an initial movement of the input piston on brake application to isolate the control chamber from the boost chamber. It is necessary to ensure that the recuperation valve does not re-open until the brakes are fully released, since if the recuperation valve opened on relaxation of braking effort the pressures in the boost and control chambers could equalise, which has the effect of making the booster uncontrollable. In known boosters of the kind set forth the recuperation valve is operated by movement of a movable part relative to a stationary housing part. For example, the valve may be operated by movement of the input piston relative to the housing, so that the recuperation valve opens when the input piston returns to its retracted position. This has the disadvantage that the recuperation valve will open even if the boost valve means is unable to connect the boost chamber to the reservoir, which means that the booster will become uncontrollable. Further, it is not possible for the input piston to work in the boost piston, which means that it is difficult to reduce the length of the booster. In another known booster of the kind set forth the recuperation valve is operated by movement of the boost piston relative to the housing, which overcomes the first disadvantage. However, in order to ensure that the control chamber can be pressurised, the area of the input piston must be greater than the area of the boost piston which is exposed to the control pressure, so it is still not possible for the input piston to work in the boost piston.

According to our invention, in a booster of the kind set forth a recuperation valve controls communication between the control chamber and the boost chamber, initial movement of the input piston in a brake-applying direction is operative to close the recuperation valve to cut off communication between the control chamber and the boost chamber, further movement of the input piston being operative to pressurise the fluid trapped in the control chamber, the boost valve means being operative in response to pressurisation of the control chamber to pressurise the boost chamber, and the pressure in the boost chamber acts on the input piston to urge the input piston in a direction to close the recuperation valve.

Since the pressure in the boost chamber acts on the input piston to urge it to close the recuperation valve, the recuperation valve will remain closed until the boost pressure is relieved, that is until the brakes are fully released. Also, if on brake release the boost valve means is unable to connect the boost chamber to the reservoir the recuperation valve will remain closed, so that the pressures in the boost chamber and the control chamber cannot equalise and render the booster uncontrollable.

Thus our invention, by ensuring correct operation of the recuperation valve, enables us to provide the connection from the control chamber to the reservoir through the boost chamber, thus reducing the complexity of the booster construction. Further, the recuperation valve can be operated by relative movement between two movable parts, such as the input and boost pistons, which means that the input piston can work in a bore in the boost piston.

Preferably, therefore, the input piston works in a bore in the boost piston, and the recuperation valve is operated in response to relative movement of the input piston and the boost piston.

Thus our invention has the further advantage that the length of the booster can be reduced since the input piston works within the boost piston. The construction enables the booster to be overhung to reduce its effective length, that is, for a substantial portion of the stroke length of the boost piston to be located outside the housing so that pedal travel is limited not by the housing but by the boost piston which moves forward in operation. Further, the construction enables a master cylinder, on which the boost piston acts, to be recessed into the forward end of the booster, which reduces the overall length of the combined booster and master cylinder assembly.

Preferably the control chamber is defined in the boost piston and is forward of the boost chamber. The pressure in the boost chamber acts on an area of the input piston which is to the rear of the recuperation valve.

Conveniently, the recuperation valve comprises a seal on the foward end of the input piston which co-operates with a radial port in the boost piston providing communication between the boost chamber and the control chamber. A further radial port in the boost piston allows the pressure in the boost chamber to act on an area of the input piston to the rear of the seal in order to urge the input piston forwardly.

Conveniently, the booster is arranged such that during a brake application, the fluid in the control chamber is at a higher pressure than the fluid in the boost chamber, and the difference between them is substantially constant, and relatively low. This has the advantage that the two seals separating the control and boost chambers—one on the boost piston and the seal on the input piston—are not normally subjected to a large pressure differential so that the hysteresis due to the seals is reduced. Further, any leakage between the chambers will be from the control chamber to the boost chamber, thus avoiding possible loss of control.

Preferably the boost valve means comprises a spool working in a bore in the housing, the spool having opposing pressure-responsive faces, with the pressure in the control chamber acting on one face and the pressure in the boost chamber acting on the opposing face. The valve spool is spring-loaded towards the position in which the boost chamber is connected to the outlet, and the load in the spring and the ratio of the opposing pressure responsive faces on the valve spool ensure that the control pressure is normally higher than the boost pressure.

An embodiment of our invention is shown in the single FIGURE of the accompanying drawings, which shows a longitudinal section through an hydraulic booster.

The booster shown in the FIGURE comprises a housing 1 provided with a stepped through-bore 2, in which a boost piston 3 works. The boost piston 3 transmits an output force to a master cylinder (not shown) through an output rod 4, in response to pressure in a boost chamber 5 defined in the bore 2. Pressurisation of the boost chamber 5 is controlled by boost valve means 6 located in a bore 7 in the housing 1. The boost valve means 6 controls communication between the boost chamber 5 and an inlet 8 in the housing for connection to a source of fluid pressure, suitably an accumulator 63, and between the boost chamber 5 and an outlet 9 for connection to a reservoir 64 for fluid. The valve means 6 is responsive to pressure in a control chamber 10, pressurisation of which is controlled by an input piston 11 working in a stepped blind bore 12 in the boost piston 3 and actuated by a pedal-operated input rod 13. A recuperation valve 14 which controls communication between the boost chamber 5 and the control chamber 10 is controlled by relative movement of the input piston 11 and the boost piston 3.

The boost piston 3 is of stepped outline, and projects rerwardly outside the housing 1 so that it is overhung. The output rod 4 is biassed into engagement with the boost piston 3 by a spring 15 which acts between an annular retainer 16 fixed to the rear end of the rod 4, and an abutment member 17 which is a press fit in the bore 2 at the forward end of the housing 1. The spring 15 also biasses the boost piston 3 rearwardly so that in the inoperative position shown, a shoulder 18 at a step in diameter of the boost piston 3 engages a shoulder 19 at a step in the bore 2. The boost piston 3 is provided with the bore 12 in which the input piston 11 works. The control chamber 10 is defined in the forward part of the bore 12 and by an annular chamber 20 defined round the forward end of the boost piston 3 between spaced seals 21, 22, the chamber 20 being connected to the bore 12 by a dimetral passage 23 in the boost piston 3. The boost chamber 5 is defined by a chamber round the boost piston 3, between the seal 22 on the boost piston 3 and a seal 24 in a smaller diameter portion of the bore 2 at the rearward end of the housing 1.

The input piston 11 is also stepped outline, and is biassed rearwardly by a spring 25 acting between the boost piston 3 and a shoulder 26 formed by a forward reduced diameter portion 27 on the input piston 11. A spherical head 28 on the input rod 13 is received in the recess 29 in the rearward end of the piston 11, and rearward movement of the input piston 11 and the rod 13 is limited by their engagement with an abutment member 30 retained in the bore 12 by a circlip 31. The abutment member 30 also retains a flanged annular member 32 in the bore 12, and a portion 33 of the input piston 11 of intermediate diameter works in the member 32, which also carries a seal 34.

The recuperation valve 14 is formed by a seal 35, carried on a portion of the input piston 11 of greatest diameter, which co-operates with a radial port 36 in the boost piston 3, which provides communication between the control chamber 10 and the boost chamber 5. In the inoperative position shown the recuperation valve 14 is open, so that communication between the boost chamber 5 and the control chamber 10 is permitted. Movement of the input piston 11 in a brake-applying direction relative to the boost piston 3 moves the seal 35 to close the recuperation valve 14, trapping fluid in the control chamber 10 which is pressurised on further movement of the input piston 11. A second radial port 37 in the boost piston 3 provides a permanent communication between the boost chamber 5 and an annular chamber 38 in the bore 12 round the portion 33 of the input piston 11. The pressure in the boost chamber 5 is also present in this annular chamber 38 and acts on the input piston 11 to urge it in a direction to close the recuperation valve 14.

The pressure in the control chamber 10, the control pressure, acts on the boost valve means 6 via a radial port 39 in the housing 1 connecting the bore 2 to the bore 7. The control chamber 10 can be bled by means of a bleed screw 40, connected to the control chamber 10 by the port 39, the bore 7 and an inclined passage 41 leading from the bore 7. The boost valve means 6 comprises a spool 42 of stepped outline working in the bore 7 and in a bore 43 of a stationary sleeve 44 located at the outer end of bore 7. The sleeve 44 forms with the bore 7 an inlet recess 45 in communication with the inlet 8, and the sleeve 44 has inlet ports 46 providing communication between the recess 45 and the bore 43. Similarly an exhaust recess 47 is formed in the bore 7 in communication with the outlet 9, and the sleeve 44 has exhaust ports 48 providing communication between the recess 47 and the bore 43. Three spaced seals 49, 50, 51 are provided round the sleeve 44 to seal the inlet and exhaust recesses.

The spool 42 is biassed towards the bore 2 by a spring 52 which is located round a portion 53 of the spool 42 of least diameter and acts between the spool 42 and the sleeve 44. The spool 42 also has an inner end 54 of greatest diameter which works in the inner end of the bore 7 and carries a seal 55 to seal the outer end of the bore 7 from the control chamber 10, and an outer end 56 of intermediate diameter which works in the sleeve bore 43. The outer end 56 is provided with an inwardly-extending bore 57 leading to a diametral port 58, which is in communication with a chamber 59 formed in the bores 7 and 43 round the spool portion 53. The outer ends of the bores 7 and 43 are closed by a sealed plug 60 located in the bore 7 by a circlip 61. The chamber 59 communicates with the boost chamber 5 through an inclined passage 62.

Thus the control pressure acts on the inner end 54 of the spool 42 to urge it outwardly, against the loading in the spring 52, and boost pressure acting in the chamber 59 and a chamber between the spool 42 and the plug 60. These forces control the movement of the spool 42 to control communication of the ports 57 and 58 with the inlet and exhaust ports of the sleeve 44.

In the inoperative position shown all the parts are retracted, and the recuperation valve 14 is open so that the control chamber 10 is in communication with the boost chamber 5, and the boost chamber 5 is connected to the reservoir through the boost valve means 6—that is through passage 62, chamber 59, port 58, bore 57, port 48 and exhaust recess 47.

When the booster is to be operated, a force applied to a pedal (not shown) is transmitted to the input piston 11 through the input rod 13, causing movement of the input piston 11 against the loading in the spring 25 and relative to the boost piston 3 moves the seal 35 past the port 36 to close the recuperation valve 14 trapping fluid in the control chamber 10. Further movement of the input piston 11 then starts to pressurise the fluid in the control chamber 10, which acts on the inner end 54 of the spool 42. When the control pressure acting on the spool 42 produces a force sufficient to overcome the force in the spring 52 the spool 42 moves outwardly. Movement of the spool 42 first moves the end 56 of the spool 42 across the exhaust ports 48 to cut off communication between the boost chamber 5 and the reservoir, and subsequently brings the chamber 59 into communication with the inlet ports 46 to open communication between the pressure source and the boost chamber 5, to start pressurisation of the boost chamber 5.

The pressure in the boost chamber 5 (boost pressure) acts on the boost piston 3 to provide an output force which is transmitted by the output rod 4 to the master cylinder to start pressurisation of the braking system. Once the recuperation valve 14 has closed movement of the boost piston 3 will be the same as movement of the input piston 11 to ensure that the recuperation valve 14 remains closed. The boost pressure is present in the chamber 38, where it acts on the input piston 3 to urge it in a brake-applying direction, and also in the chamber 59 and via the passage 57, where it acts on the outer end of the spool 42 in opposition to the control pressure. When the forces on the spool 42 due to the boost pressure and the spring 52 overcome the force due to the control pressure, the spool 42 will move into the equilibrium position, in which the boost chamber 5 is connected neither to the pressure source nor to the reservoir. The spool 42 and the spring 52 are arranged so that in the equilibrium position the control pressure is higher than the boost pressure, and the difference is conveniently 2 bars.

If the effort on the pedal is relaxed, but not wholly removed, then the control pressure decreases to allow the valve spool 42 to move inwardly, re-opening communication between the boost chamber 5 and the reservoir until the forces on the spool 42 equalise and it moves back into the equilibrium position. The boost pressure in the chamber 38 urges the input piston 11 in a brake-applying direction to ensure that the recuperation valve 14 remains closed.

If the effort on the pedal is removed altogether, the control pressure decreases to allow the spool 42 to open communication between the boost chamber 5 and the reservoir, and the boost piston 3 and the input piston 11 move back into their retracted positions. The recuperation valve 14 opens to connect the boost chamber 5 to the control chamber 10 only when the boost pressure has fallen to a level at which the spring 25 can overcome the effect of the boost pressure acting in the chamber 38. Should the valve spool 42 stick in the open or equilibrium positions when the pedal effort is reduced, then the control pressure decreases, but the boost pressure does not. The boost pressure acting on the input piston 11 in the chamber 38 will ensure that the recuperation valve 14 remains closed as long as the valve is stuck, and then the boost pressure acting on the spool 42 will, in general, produce a force sufficient to move the spool 42 inwardly to connect the boost chamber 5 to the reservoir. It is important to ensure that the recuperation valve 14 remains closed in this situation, since if it opened fluid flowing from the boost chamber 5 to the control chamber 10 could balance the spool 42 with the booster operative, and it would then be impossible to control the booster in the order to release the brakes.

Should the source of pressure fluid fail, the input piston 11 would engage with the boost piston 3 to actuate the boost piston mechanically.

The booster has the advantage that only a relatively small number of full stroke sliding seals is required, and of the three on the boost piston 3, only two, 21 and 24, are subjected to the full pressure differential. The central seal 22, and the seal 35 on the input piston 11 are subjected only to the pressure differential of 2 bars between the control chamber 10 and the boost chamber 5, which reduces the friction generated by movement of the boost piston 3. The remaining seals are either static or short stroke and seals 35 and 55 only have a low-pressure differential. These seals can be of P.T.F.E. to reduce friction further. Further the construction has the advantage that the inlet and exhaust recesses 45, 47 are sealed by stationary seals 49, 50, 51.

A further advantage of this construction is that, since the control pressure is higher than the boost pressure, leakage from the boost chamber 5 to the control chamber 10 past the seal 22 will not occur and so the situation described above in which the booster becomes uncontrollable is avoided. In fact, any leakage past the seal 22 will be in the opposite direction until the input piston 11 engages with the boost piston 3, and the spool 42 will then move inwardly to its retracted position, so that further actuation of the booster is by direct actuation of the boost piston 3.

It is common in hydraulic systems under pressure for the fluid to aerate and froth with gas bubbles. This would normally be a disadvantage in a booster which relies on pressurisation of a control chamber in order to control operation of the boost valve. However, in this construction the control chamber 10 is isolated from the boost chamber 5 before pressure fluid is admitted to the boost chamber 5, and is not re-connected until the boost chamber 5 is almost at reservoir pressure, which should ensure that bubbles are not normally admitted to the control chamber 10. However, it may happen that a small volume of aerated fluid is drawn into the control chamber 10 by the last part of the return travel of the input piston 11. The end of the bore 12 is reduced so that the recuperation port 36 is at the highest point of the bore 12 which allows any bubbles to escape while the booster is inoperative. If the booster is operated immediately after a bubble has entered, the initial flow of fluid on actuation, before the recuperation valve closes, is from the control chamber 10 to the boost chamber 5, which tends to purge the bubble away.

It can thus be seen that the booster has several advantages, including constructional simplicity, a short effective length and the ability to accommodate an overhung master cylinder, together with low seal friction and hysteresis.

I claim:

1. An hydraulic booster for a vehicle braking system comprising a housing provided with a bore, an inlet for connection to a fluid pressure source, and an outlet for connection to a reservoir for fluid, a pedal-operated input piston, a boost piston working in said bore, a boost chamber, pressurisation of which operates said boost piston to provide an output force, boost valve means for controlling pressurisation of said boost chamber by controlling communication between said inlet and said boost chamber and between said outlet and said boost chamber, a control chamber, fluid in said control chamber being pressurised in response to operation of said pedal-operated input piston, said boost valve means being operable in response to pressure in said control chamber, and a recuperation valve for controlling communication between said control chamber and said boost chamber, said input piston including a valve-operating means for closing said recuperation valve to cut off communication between said control chamber and said boost chamber on initial movement of said input piston, said input piston also including means for pressurising fluid trapped in said control chamber following further movement of said input piston, said boost valve means being operative, in response to pressure in the control chamber, to pressurise said boost chamber, and said input piston has a pressure-responsive means on which said pressure in said boost chamber acts such that said valve-operating means is operative to close said recuperation valve.

2. A booster as claimed in claim 1, wherein said boost piston is provided with a bore, and said input piston works in said bore in said boost piston, said recuperation valve being operated by said valve-operating means in response to relative movement of said input piston and said boost piston.

3. A booster as claimed in claim 1 or claim 2, wherein said control chamber is defined in said boost piston.

4. A booster as claimed in claim 3, wherein said control chamber is forward of said boost chamber.

5. A booster as claimed in claim 1, wherein said pressure-responsive means comprises an area of said input piston to the rear of said recuperation valve.

6. A booster as claimed in claim 2, wherein said recuperation valve comprises a seal on the forward end of said input piston which co-operates with a first radial port in said boost piston providing communication between said boost chamber and said control chamber.

7. A booster as claimed in claim 6, wherein a second radial port in said boost piston allows the pressure in said boost chamber to act on said pressure-responsive means, which comprises an area of said input piston to the rear of said seal, in order to urge said input piston forwardly.

8. A booster as claimed in claim 1, wherein said boost valve means comprises a spool working in a bore in said housing, said spool having opposing pressure-responsive faces, with the pressure in said control chamber acting on one said face and the pressure in said boost chamber acting on the opposing said face.

9. A booster as claimed in claim 8, wherein said valve spool is spring-loaded towards the position in which said boost chamber is connected to said outlet, and the load in said spring and the ratio of said opposing pressure-responsive faces on said valve spool ensure that the control pressure is normally higher than the boost pressure.

* * * * *

UNITED STATES PATENT AND TRADEMARK OFFICE
CERTIFICATE OF CORRECTION

PATENT NO. : 4,443,040
DATED : April 17, 1984
INVENTOR(S) : Glyn P. R. Farr

It is certified that error appears in the above-identified patent and that said Letters Patent are hereby corrected as shown below:

On the title page assignee should read

-- Assignee: Lucas Industries public limited company, Birmingham, England --

Signed and Sealed this

Seventeenth Day of July 1984

[SEAL]

Attest:

GERALD J. MOSSINGHOFF

Attesting Officer     Commissioner of Patents and Trademarks